United States Patent [19]

Funabashi et al.

[11] 4,356,536

[45] Oct. 26, 1982

[54] FAIRING AND HEADLIGHT ASSEMBLY FOR A TWO-WHEELED MOTOR VEHICLE

[75] Inventors: Katsunori Funabashi, Kawagoe; Jyoji Taira, Asaka, both of Japan

[73] Assignee: Honda Giken Kogyo Kabushiki Kaisha, Tokyo, Japan

[21] Appl. No.: 184,613

[22] Filed: Sep. 8, 1980

[30] Foreign Application Priority Data

Sep. 17, 1979 [JP] Japan ............................ 54-126873[U]

[51] Int. Cl.³ .......................................... F21V 33/00
[52] U.S. Cl. ................................... 362/72; 362/226; 362/287; 362/306; 362/364; 362/365; 362/372; 362/417; 362/419; 362/426; 362/430
[58] Field of Search ................ 362/72, 226, 287, 306, 362/364, 365, 417, 419, 372, 426, 430

[56] References Cited

U.S. PATENT DOCUMENTS

| | | | |
|---|---|---|---|
| 3,922,031 | 11/1975 | Hugon | 362/72 |
| 4,121,278 | 10/1978 | Doll | 362/72 |
| 4,262,959 | 4/1981 | Saunders | 362/72 |

*Primary Examiner*—Stephen J. Lechert, Jr.
*Attorney, Agent, or Firm*—Armstrong, Nikaido, Marmelstein & Kubovcik

[57] ABSTRACT

A fairing and headlight assembly for a motorized two wheel vehicle is disclosed, in which the headlight is carried by a yoke which is removably received within grooves in a recess of the fairing and is detachably secured within the fairing by a single screw threaded member which extends to the exterior of the fairing through an aperture therein. The yoke carries a lamp-supporting gimbal mount which is separately adjustable about horizontal and vertical axes, movement of the gimbal about a horizontal axis being under the control of an adjustable member which extends to the exterior of the fairing through said threaded member.

4 Claims, 5 Drawing Figures

FAIRING AND HEADLIGHT ASSEMBLY FOR A TWO-WHEELED MOTOR VEHICLE

FIELD OF THE INVENTION

This invention relates to a fairing and headlamp assembly for a motorized two-wheeled vehicle, such as a motorcycle or the like.

BACKGROUND OF THE INVENTION

In such vehicles, it is known to provide a fairing at the front end thereof which is rigidly attached to the vehicle body. The provision of such a fairing necessitates the separate mounting of the headlight on the vehicle, this resulting in an increase in the number of parts required, with a consequential increase in the cost of the assembly, and, additionally resulting in a cosmetically unattractive assembly which finds limited commercial acceptance.

OBJECT OF THE INVENTION

The object of this invention is to provide a cosmetically attractive fairing and headlight assembly for a two-wheeled motor vehicle, in which the fairing itself provides the required rigid support for the headlight, and, in which the headlight is readily detachable for servicing or replacement.

Additionally, it is an object of this invention to provide such an assembly in which a lamp of the headlight is independently adjustable about horizontal and vertical axes in order to permit correct adjustment of the headlight beam relatively to the vehicle body, and in which adjustment of the lamp about the horizontal axes conveniently can be effected by the user of the vehicle during operation thereof.

INVENTIVE CONCEPT

According to the present invention, the fairing is provided with a recess within which a sub-assembly incorporating a lamp of the headlight is detachably received, the fairing including grooves or tracks within the recess within which arms of a yoke of the headlight sub-assembly are slidably received, the headlight sub-assembly including a member associated with the yoke and which extends through an aperture in the fairing, and, which is rigidly secured to the fairing to hold the headlight sub-assembly immovable within the fairing. In the preferred embodiment of the invention, the yoke carries a gimbal mount in which the lamp is supported, the gimbal mount providing for the separate adjustment of the lamp about horizontal and vertical axes under the control of adjustment members, the member for adjusting the lamp about a horizontal axes being adjustable from a convenient position rearwardly and externally of the fairing.

BRIEF DESCRIPTION OF THE DRAWINGS

The invention will now be described with reference to the accompanying drawings, in which.

DESCRIPTION OF THE INVENTION

Figure 1:
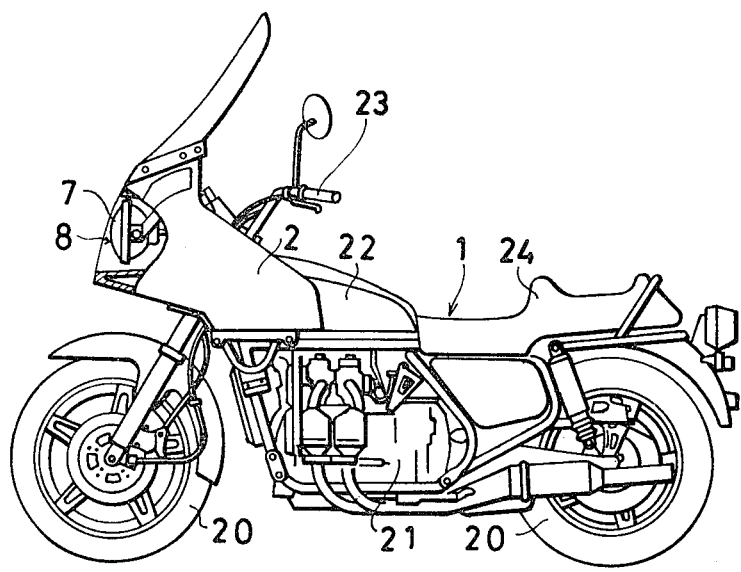
FIG. 1 is a side view of a motorized two-wheeled vehicle incorporating a fairing and headlight assembly according to the present invention, the fairing being shown partly in section.

Referring more particularly to FIG. 1 of the drawings, there is illustrated by the reference 1 a motorcycle of a conventional type, including ground wheels 20, an internal combustion engine 21, a gasoline tank 22, handle bars 23, and a riders seat 24.

Extending forwardly of the gasoline tank 22 is a fairing, which is supported by the body of the motor vehicle in any convenient manner, the fairing having a recess in the front face thereof defined by the walls 3. The fairing may be formed of any suitable material, and conveniently is formed from a reinforced synthetic resin as a molding thereof.

Figure 2:
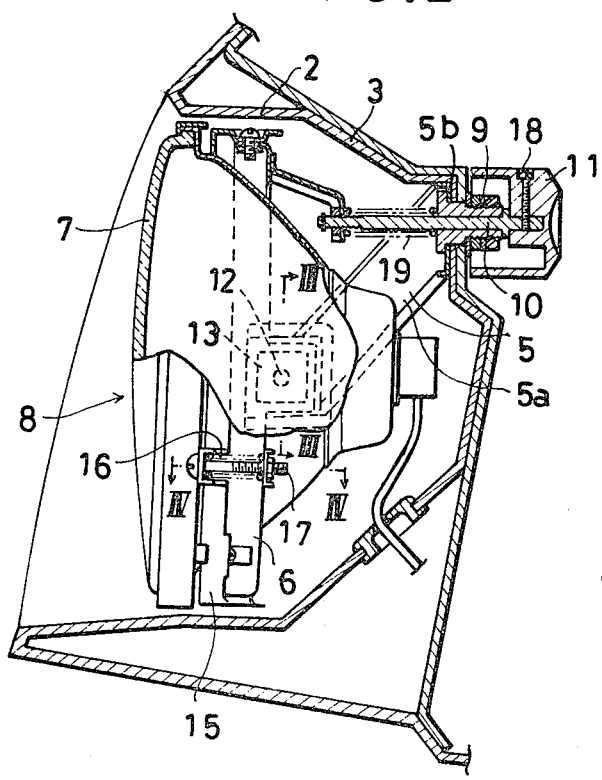
FIG. 2 is an enlarged sectional side elevation of the fairing showing the headlight assembly positioned therein in partial section.
Figure 3:
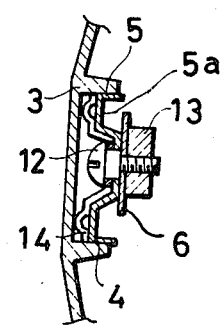
FIGS. 3 and 4 are fragmentary sectional views taken along the lines III–IV–V of FIG. 2; and, FIG. 5 is an exploded perspective view of the assembly.
Figure 4:
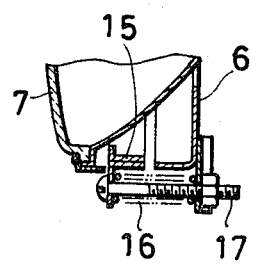
Figure 5:
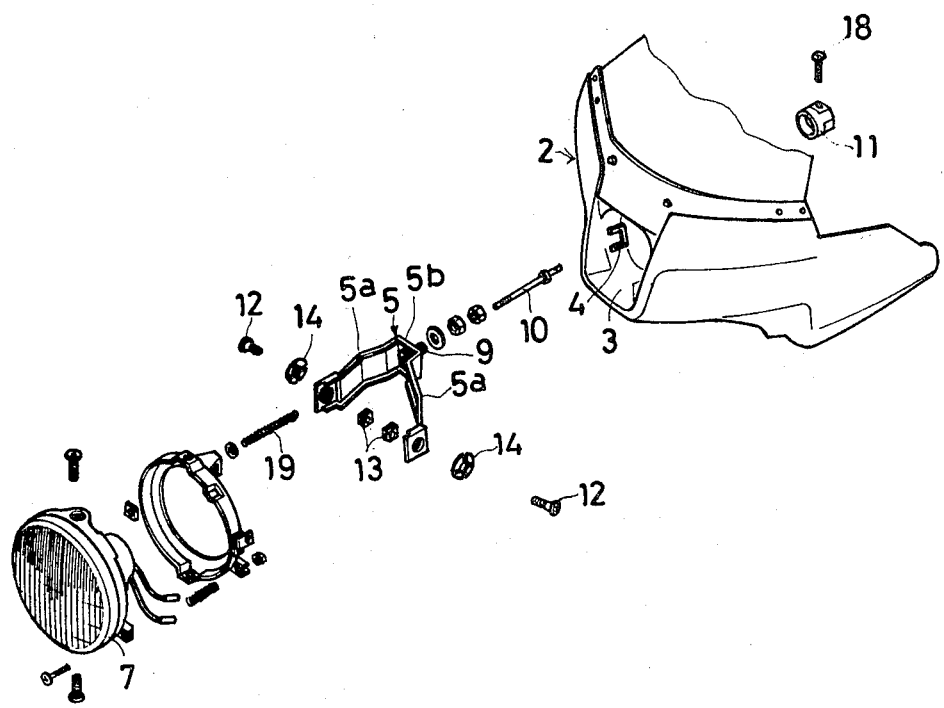

Referring now more particularly to FIGS. 2, 3 and 5, the inwardly presented walls of the recess 3 are formed with substantially horizontally extending grooves 4 on the opposite lateral sides thereof, the grooves providing tracks for guiding a headlight sub-assembly, indicated generally by the reference 8 in FIGS. 1 and 2, into proper orientation within the recess, the grooves 4, in part, providing a support for the headlight sub-assembly for holding that sub-assembly rigid and immovable within the recess.

The headlight sub-assembly includes a yoke 5 which diverges from a central portion 5b into downwardly and outwardly extending arms 5a, which, at their terminal ends are slidably received within the respective grooves 4 in tight-fitting relationship therewith. The central portion 5b of the yoke 5 abuts a substantially planar wall of the recess 3, and has secured thereto an externally threaded sleeve member 9 which extends through an aperture in the fairing to the exterior thereof, the yoke 5 being rigidly clamped within the aperture of the fairing by a suitable member threaded onto the sleeve 9. At this point it is observed that the yoke 5 is rigidly supported within the fairing by the use of a single threaded member or nut, the arms 5a of the yoke being held immovable in the grooves 4, while the central portion 5b of the yoke is rigidly clamped to the fairing by the use of a single threaded member. As will be readily appreciated, the yoke 5 and the members which are carried by that yoke readily can be detached from the fairing and removed therefrom, merely by removing the threaded member from the sleeve 9, and the sliding the entire assembly forwardly for removal from the recess.

In order to prevent undesirable rattling of the yoke arms 5a within the grooves 4, the terminal ends of the arms are provided with inwardly extending flanges which are a press fit within the grooves. Additionally, for the purpose of further reducing noise and rattle, resilient washers 14 are secured to the outwardly facing surfaces of the yoke arms 5a by means of a recessed screw 12, the washer 14 bottoming in the associated groove.

Carried by the arms 5a of the yoke is a mounting ring 6 which is pivotally supported on the screws 12 and resiliently clamped against the yoke arms 5a by a nut, which preferably is formed from a resin material. The bolts 12 thus provide pivots arranged on a transverse horizontal axis, about which the mounting ring 6 can pivot, pivotal movement of the mounting ring 6 being under the control of an adjustment member constituted by a threaded shaft 10 which extends through the interior of the sleeve 9, and which at its outer end is provided with a radial flange and an adjusting knob 11 which is secured thereto by a screw 18. At its opposite end, the threaded shaft 10 extends through a nut carried by an extension of the mounting ring 6, rotation of the shaft 10 resulting in the nut travelling along the shaft and adjusting the position of the mounting ring 6 about the said horizontal axes. A spring 19 surrounds the threaded shaft 10, and reacts at its ends, respectively, against the threaded sleeve 9 and the extension carried by the mounting ring 6. By appropriate rotation of the control knob 11, the mounting ring 6 is moved to either raise or lower the beam of the headlamp 7 in a vertical plane.

Attached to the mounting ring 6 for pivotal movement relatively thereto about a vertical axes is a second mounting ring 15, which carries an adjusting screw 17 which is held captive at one of its ends in a lateral extension of the ring 15, and, which at the other of its ends is threadly received within a nut carried by an extension of the ring 6. Surrounding the screw 17 is a spring 16, which reacts at its ends on the respective lateral extensions of the mounting rings 15 and 16, thus maintaining the ring 15 in the angular position to which it has been adjusted. By appropriate rotation of the screw 17, the headlamp 7 is moved about a vertical axes for adjustment of the beam of the headlamp in a horizontal plane.

As will be appreciated from the foregoing description, a fairing and headlight assembly has been provided, which, in addition to being cosmetically attractive, has the great advantage of providing for ready attachment and detachment of the headlamp sub-assembly from the fairing, for assembly or servicing thereof, merely by tightening the threaded member onto the threaded sleeve 9, or, removing the threaded member thereof, subsequent, of course, to removal of the knob 11. Additionally, subsequent to alignment of the headlamp beam in a horizontal plane, the alignment of the headlamp beam in a vertical plane can be varied at the convenience of the rider by the simple expedient of rotating the knob 11.

While the present invention has been described in conjunction with a preferred embodiment thereof, it will be appreciated that various modifications and variations may be made without departing from the scope of the invention as defined in the appended claims.

We claim:

1. A fairing and headlight assembly for a two-wheeled motor vehicle, comprising:
    fairing carried by the motor vehicle and which has a recess in a forwardly presented face thereof for the reception of a headlight sub-assembly, walls of said recess providing opposite substantially horizontally extending grooves for the reception and support of members of said headlight sub-assembly; and
    a headlight sub-assembly detachably received within said recess, said headlight sub-assembly including,
        a yoke having arms which terminate in members positioned within the respective grooves of the fairing with a tight fit and which are slidable longitudinally of said grooves; and
        a threaded sleeve rigidly supported by said yoke and which extends through an aperture in the fairing, and which is rigidly secured therein by a threaded member received on said sleeve to secure said yoke and said headlight sub-assembly immovably within said recess.

2. The fairing and headlight assembly of claim 1, in which said headlight sub-assembly further includes:
    a mounting ring pivotally supported on said terminal members of said yoke for movement about a transverse horizontal axis; a threaded adjustment member received within an internally threaded member carried by said lamp mounting ring at a position displaced circumferentially from the pivot support thereof, said threaded adjustment member extending through said threaded sleeve of the yoke and being rotatable from a position exterior of said fairing; and stop members associated with said threaded adjustment member and said threaded sleeve inhibiting axial movement of said threaded adjustment member relatively to said threaded sleeve.

3. A fairing and headlight assembly according to claim 2, in which said headlight sub-assembly further includes:
    a resilient member surrounding said threaded adjustment member and which reacts against the internally threaded member of said lamp mounting ring and the opposed face of the threaded sleeve.

4. The fairing and headlight assembly according to claim 2 or claim 3, in which said headlight sub-assembly further includes:
    a second lamp mounting ring pivotally supported on the other said mounting ring for movement about a vertical axes.
    a threaded adjustment member carried by one of said rings and which is threadedly received within an internally threaded member carried by the other of said rings; and
    members carried by said second lamp mounting ring for detachably attaching a headlamp thereto.

* * * * *